March 10, 1970     R. W. HEARD     3,499,413
ROAD MARKERS
Filed Jan. 24, 1968     2 Sheets-Sheet 1
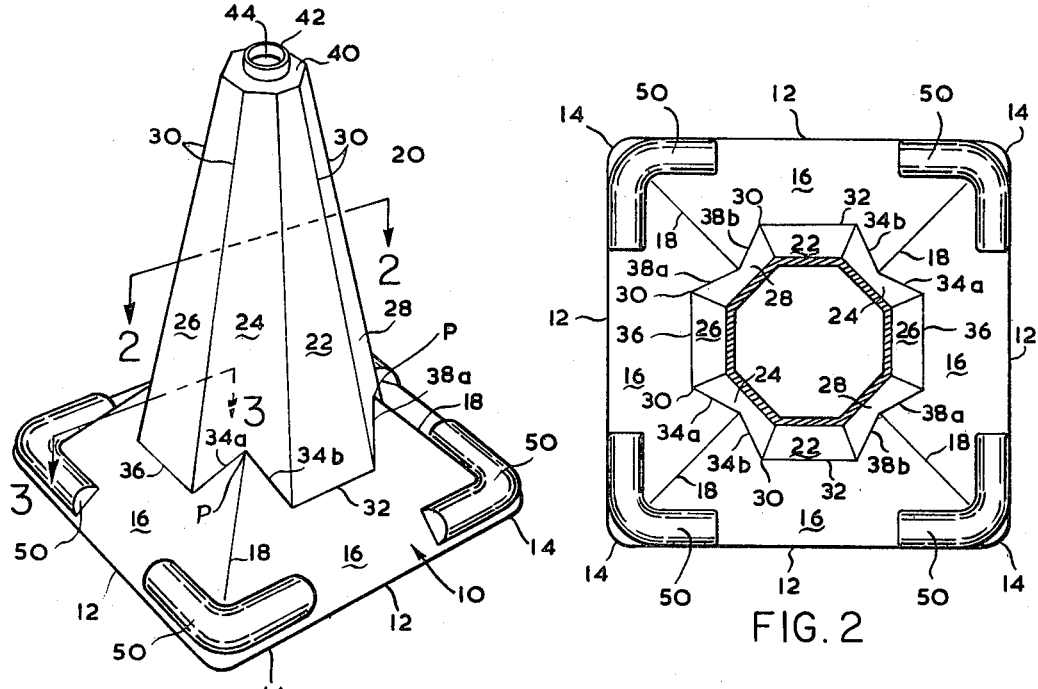
FIG. 1
FIG. 2
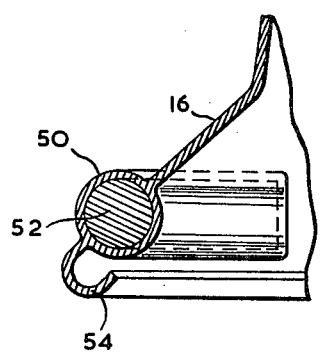
FIG. 3
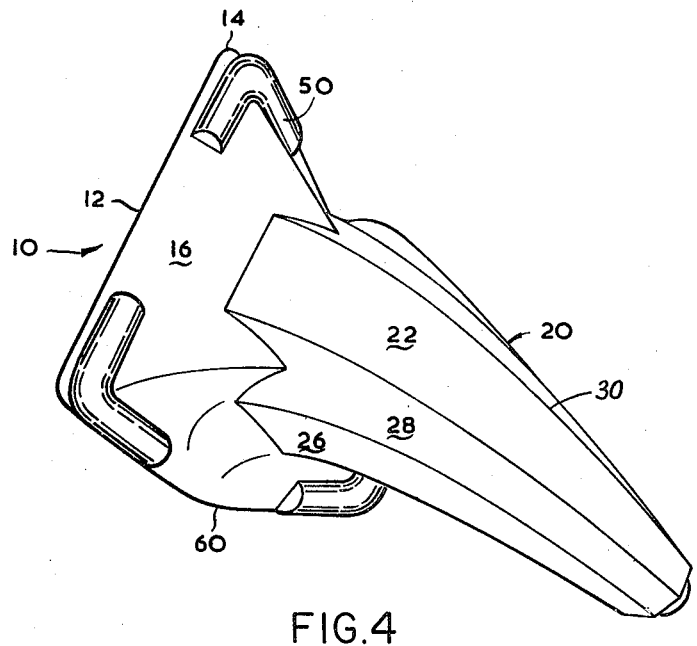
FIG. 4
INVENTOR
ROBERT W. HEARD
ATTORNEY

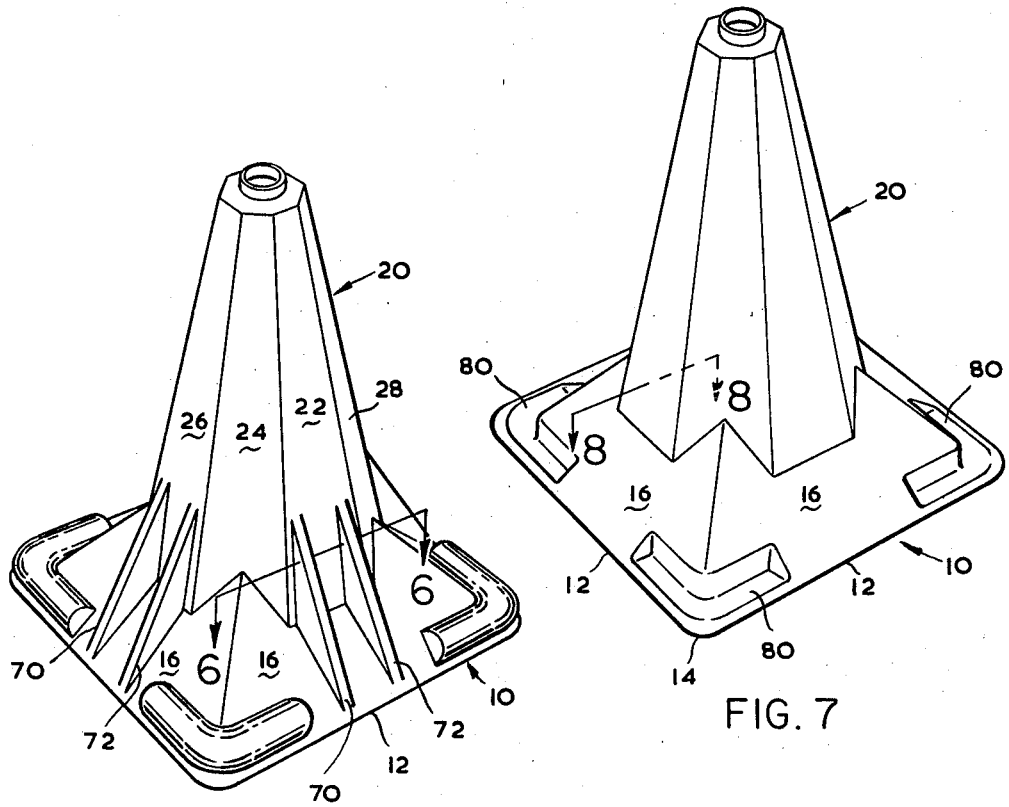
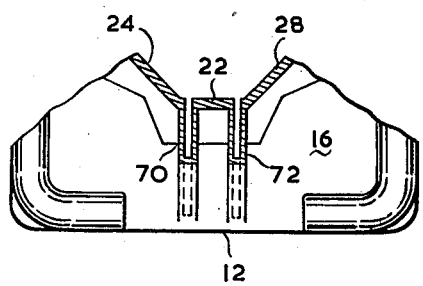
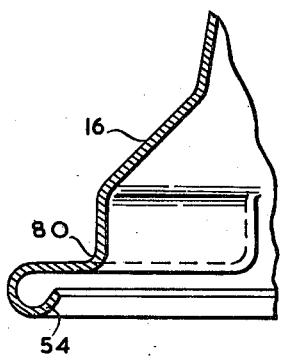

United States Patent Office 3,499,413
Patented Mar. 10, 1970

3,499,413
ROAD MARKERS
Robert W. Heard, 391 Bell St., Milton, Ontario, Canada
Filed Jan. 24, 1968, Ser. No. 700,060
Int. Cl. G01f 13/00
U.S. Cl. 116—63                29 Claims

ABSTRACT OF THE DISCLOSURE

A road marker comprises a hollow body member that is fabricated of a flexible, resilient material and that includes a base portion and an upper portion, weights being associated with the base portion to lower the centre of gravity of the hollow body member, the weights being spaced apart from and discontinuous with respect to each other and located at different points around the perimeter of the base portion by virtue of which the weights are separated from each other by unweighted parts of the base portion.

In another embodiment the base and upper portions both are of polygonal configuration and are so oriented with respect to each other that the side corners of the base portion terminate at points that are intermediate adjacent side corners of the upper portion.

---

The present invention relates generally to road markers and, more particularly, in one aspect, to hollow road markers having an improved ability to return to their normal shape after deformation, for instance, after they have been hit by the wheel of a motor vehicle. In another aspect, this invention relates to the weighting of road markers to decrease their tendency to upset in high winds or when struck.

Attempts have previously been made to reinforce road markers made from a resilient material by the incorporation therein of a reinforcing material such as a metal. Such previous attempts have, however, frequently led to markers which are so rigid that they can cause actual damage to a vehicle wheel and particularly to a vehicle tire that inadvertently comes into collision with such a marker. A further disadvantage of such previously known reinforced markers is that they are often permanently distorted when hit by a vehicle wheel.

The present invention in one aspect is based on the finding that these and other disadvantages can be considerably lessened by the provision of a road marker constructed of a material having good shape restoring characteristics and being of unique structural design and reinforced in a specific manner.

In accordance with a first aspect of the present invention, a hollow road marker of resilient material comprises a hollow, polygonal pyramid-like body having lateral faces with base edges meeting at base corners, the lateral faces being provided with reinforcement near and only partially along the base edges.

It should be noted that the reinforcement extends only partially along the base edges of the marker. By the disposition of reinforcement in this manner, it is still possible for the marker to bend readily along its base edges in those parts where no reinforcement is provided. In this way, the danger of permanent deformation of or damage to the marker is considerably reduced. Such partial reinforcement of a marker will normally be provided in each of its lateral faces, and it has been found to be particularly advantageous to have the reinforcement extend from each of the base corners of the marker partially along and substantially parallel to and near each of the base edges of the marker. A particularly preferred construction is one in which the reinforcement is uninterrupted about the base corner and extends partially along and substantially parallel to and near each adjacent base edge.

The discontinuous reinforcement of the marker may be provided in any suitable manner, but particularly satisfactory results have been obtained by providing the reinforcement by the formation of inwardly and/or outwardly directed deformations or ribs in the lateral faces of the pyramidal body. Such deformation of the material of the lateral face or faces of the marker may in itself provide sufficient reinforcement but, if additional reinforcement is required, a reinforcing material may be secured within sockets defined by the ribs. For instance, metal members may be secured in such pockets. The second aspect of this invention pertains to the weighting of road markers.

While road markers have been weighted in the past by incorporating metal rings or plates into their bases, this practice is objectionable for the reasons previously given.

In accordance with the second aspect of this invention, separate weights spaced apart from and discontinuous with respect to each other are incorporated into the base portion of a road marker. The weights, being spaced apart from each other and separated by the resilient material of the marker, do not appreciably inhibit deformation of the marker when it is struck, as is the case with metal rings or plates extending throughout the base of a marker.

Both aspects of the invention hitherto discussed can be and preferably are combined by providing weights, e.g., metal members having a higher density than the density of the material from which the body of the marker is constructed, in the aforementioned pockets. This will lower the centre of gravity of the marker and render it less liable to be knocked over inadvertently from its normal upright position.

It is to be understood, however, that the two aspects of a road marker embodying this invention hitherto discussed may be practised independently of each other.

The road markers of the present invention may be manufactured from any suitable material but particularly useful results have been obtained in practice by the use of brightly coloured polyvinyl chloride compositions.

In accordance with a third aspect of the invention, highly useful road markers are comprised of two integrally formed portions. In its broadest concept, this third aspect of the invention relates to a hollow road marker of resilient material comprising a hollow, base portion generally in the form of a truncated polygonal pyramid having a plurality of lateral faces defining an apical angle and having base edges and side corners and a hollow upper portion generally in the form of a polygonal pyramid having at least as many lateral faces and side corners as base portion, the lateral faces of the latter defining a smaller apical angle than the apical angle of the base portion, the upper portion being integrally formed with the base portion and so oriented with respect thereto that the said corners of the base portion terminate at their upper ends at points intermediate adjacent side corners of the upper portion.

Hollow road markers of this form show many advantages. In particular, they frequently show increased resistance to permanent deformation and a much more rapid return to their undeformed shape after deformation.

Although the upper portion of such a marker may have the same number of lateral faces as the base portion, it is generally preferred to provide the upper portion with twice as many lateral faces as the base portion. In such a construction, the side corners of the base portion will normally terminate at their upper ends in alternate lateral faces of the upper portion.

In order to provide a symmetrical marker, both the upper end base portions will normally have regular polygonal configurations, the base portion being a truncated regular polygonal pyramid, e.g. a square pyramid, and the upper portion being a regular polygonal, e.g. octagonal, pyramid or frusto-pyramid. It is generally preferred, in order to provide a symmetrical marker and to obtain the maximum shape-restorability, to have the side corners of the base portion terminate at points which are substantially equidistant from adjacent side corners of the upper portion.

In the case where the upper portion has twice as many lateral faces as the base portion, each base edge of the lower portion will preferably be substantially parallel to the base edge of the corresponding lateral face of the upper portion.

In accordance with yet another feature of this third aspect of the invention, one or more reinforcing struts may be provided between a lateral face of the base portion of the marker and the corresponding lateral face of the upper portion. In this way, the marker will have greater resistance to deformation and an improved shape-restorability.

The third aspect of this invention may be practised along with one or the other or both of the first and second aspects, or it may be practised independently.

The invention will now be described by way of illustration with reference to the accompanying drawings in which:

FIGURE 1 is a perspective view of a preferred embodiment of a hollow road marker in accordance with the present invention, FIGURE 2 is a section taken through the marker of FIGURE 1 along line 2—2 of FIGURE 1, FIGURE 3 is a fragmentary section to the left of the plane 3—3 in FIGURE 1, FIGURE 4 is a perspective view of the marker of FIGURE 1 showing the marker deformed as it might be in use, FIGURE 5 is a perspective view of another preferred embodiment of a hollow road marker in accordance with the invention, FIGURE 6 is a fragmentary section of the marker of FIGURE 5 along the line 6—6 of FIGURE 5, FIGURE 7 is a perspective view of an unweighted but reinforced hollow road marker in accordance with the invention, and, FIGURE 8 is a fragmentary section to the left of the plane 8—8 in FIGURE 7.

The same references are used in all the drawings to indicate identical parts.

The hollow road marker of flexible, resilient material shown in FIGURES 1 to 3 includes a hollow, base portion generally indicated at 10 and being a truncated polygonal pyramid which, in the embodiment illustrated, has, in plan, a square base with base edges 12 meeting at base corners 14. The truncated square pyramid 10 has lateral faces 16 which meet at side corners 18.

The hollow road marker of FIGURES 1 to 3 also comprises a hollow upper portion generally indicated at 20 and being, in the embodiment illustrated, a frustum of a regular octagonal pyramid. The regular octagonal frusto-pyramid 20 comprises pairs of opposed lateral faces 22, 24, 26 and 28 with intermediate lateral edges 30. Corners 32, 34a, 34b, 36, 38a and 38b define the intersection of base 10 and upper portion 20. The top surface of pyramid 20 comprises an upper surface 40 containing a collar 42 defining an axial opening 44 therein. Signs, flags, warning lights, etc., may be usefully disposed in opening 44. Alternatively, the upper portion pyramid 20 may not be truncated and may have an apex at its high point.

The base portion 10 and the upper portion 20 of the hollow road marker shown in FIGURE 1 are integrally formed conveniently by a single moulding operation. One important feature of the third aspect of the invention resides in the relative orientation of the upper portion 20 and the base portion 10. This feature is that the side corners 18 of the base portion 10 terminate at their upper ends at points intermediate adjacent side corners 30 of the upper portion 20. Such points are indicated at P in FIGURE 1. Such points P are, in a preferred embodiment, substantially equidistant from adjacent side corners 30.

It will also readily be seen from FIGURE 1 that the apical angle (not shown), i.e. the polyhedral angle formed by lateral faces 16 of the base portion 10, will be larger than the apical angle (not shown), i.e. the polyhedral angle formed by lateral faces 22, 24, 26 and 28 of the upper portion 20. It should be noted that references herein to such apical angles will generally refer to the apical angles of pyramids from which the upper and base portions are obtainable by truncation. Expressed in a different manner, such apical angles may be identified by imaginary projection to apices of the lateral faces of the upper and base portions.

It will further be seen that, in the preferred embodiment illustrated in FIGURES 1 to 3, the upper portion 20 has twice as many lateral faces 22, 24, 26 and 28 (a total of eight) than the base portion (four faces 16).

A second important feature of the invention, i.e., the aforesaid first aspect thereof, which may be taken alone or in combination with the feature already specifically described can also be seen from FIGURES 1 to 3 of the drawings. In these figures, it will be seen that the base portion 10 is provided with reinforcement near its base edges 12. In the embodiment illustrated, this reinforcement is provided by ribs or by inwardly and outwardly directed deformations 50 of the lateral faces 16 to form pockets having circular cross-sections. The reinforcement effected by such deformation of the lateral faces 16 is provided, in accordance with the first aspect of the present invention, in at least one lateral face of the marker and, in the preferred embodiment illustrated, in each lateral face of the marker. The reinforcement is provided near the base edge 12 of the marker and extends only partially along such base edge 12. It is even more preferred for such reinforcement to extend from a base cornor 14 partially along a base edge 12 and, in a particularly preferred embodiment, such reinforcement extends from a base corner 14 partially along each of the adjacent base edges 12, the reinforcement being uninterrupted about said base corner 14. As will be seen from FIGURES 1 and 2, the ribs are provided in the lateral faces in such a way that they are substantially parallel to and near the base edges 12.

In the marker shown in FIGURES 1 to 3, the reinforcement is further increased by the provision of L-shaped steel members 52 of circular cross-section which are contained in the aforesaid pockets. It is further preferred to have the base edges 12 inwardly curved throughout their lengths to form a continuous lip 54 (see FIGURE 3) to provide some measure of strengthening of the lower edge of the base portion 10. Such strengthening is completely different, however, from the reinforcement provided by ribs 50 and steel members 52 and only forms part of the invention insofar as it is used in combination with characterizing features of the invention.

As previously explained, one very important advantage of markers according to the first aspect of the invention is the ease with which they resume their natural shape after deformation caused, for example, by their being hit by the wheels of a motor vehicle. Such a deformed marker is shown by way of example in FIGURE 4. Since the reinforcement provided by the ribs 50 and the steel members 52 does not extend fully along a base edge 12, bending of the marker across the base edge 12 occurs at 60 and, as a result of the resiliency of the material from which the marker is made, the marker readily recovers its natural shape as soon as the vehicle wheel passes off the marker. It will readily be understood, therefore, that this particular aspect of the present invention provides all the desirable features of reinforcement without introducing the danger of the marker being permanently deformed by a vehicle wheel or by any other applied stress.

Restoration of a deformed marker to its natural shape is also facilitated by the previously described feature of the invention, namely the relative disposition of the side corners 18 of the base portion 10 and the lateral faces 22, 24, 26 and 28 of the upper portion 20. By having the side corners 18 terminate at points P intermediate adjacent side corners 30 of the upper portion, useful shape-restoring forces are provided when a marker in accordance with the third aspect of the invention is deformed.

In accordance with yet another feature of the third aspect of the present invention, additional shape-restoring forces may be provided by the provision of vertical reinforcing struts 70 and 72 (see FIGURES 5 and 6) between a lateral face 16 of the base portion 10 and a corresponding lateral face, such as face 22, of the upper portion 20. Such struts may be provided for each lateral face 16 and may be of any desired thickness and number, two struts for each lateral face 16 being shown in FIGURES 5 and 6 merely by way of example.

Another manner in which the lateral faces of the base portion 10 of a marker may be reinforced in accordance with the first aspect of the present invention is illustrated in FIGURES 7 and 8. In the embodiment illustrated in these figures, lateral faces 16 of the base portion 10 are inwardly deformed about their base corners 14 to form ribs 80. As in the case of the ribs 50 of the marker shown in FIGURES 1 to 4, the ribs 80 are provided at each base corner 14 and extend only partially along and are substantially parallel to and near the base edge 12. Such reinforcement of the marker may be provided by other inwardly and/or outwardly directed deformation of the lateral faces 16 of the base portion 10.

The markers illustrated in the accompanying drawings were moulded from polyvinyl chloride and were found to have a long useful life without suffering permanent distortion after being hit by the wheels of motor vehicles.

If desired, the lower edges of the markers may be provided with studs or projections for various purposes. They may, for instance, be provided with projections or feet and used to warn vehicle operators that marking lines on highways have been freshly painted. By the provision of such feet, the markers may straddle the painted surface and fouling of the markers with paint and disturbance of the painted surface will be avoided.

When not in use, the markers of the invention can readily be stacked for storage in a relatively small space, although this is not considered in itself to be an essential or characterizing feature of the markers of the invention but merely an ancilliary advantage thereof.

Although the markers may not fail to continue to serve their purpose if they are displaced from their normal vertical position, it is preferred that they should be relatively difficult to displace. This result is obtained, in accordance with the second aspect of the invention, by designing the markers so that they have low centres of gravity. In general, it is preferred to have the centre of gravity within the pyramid defined by the lateral surfaces, projected as necessary, of the base portion 10 of a marker. The centre of gravity of such a marker may, however, be lowered by the use of relatively heavy, spaced apart weights in the base portion 10. For instance, in the embodiment illustrated in FIGURES 1 to 4, the L-shaped steel members may be of a relatively large diameter so that they add considerable weight to the marker and consequently lower its centre of gravity. If such heavy weights were provided completely around the base of the marker, as by a metal ring, there would be a considerable danger of the marker being damaged when hit by a vehicle wheel or alternatively of the vehicle wheel itself being damaged. These dangers are considerably reduced by the provision in accordance with the second aspect of this invention of separate weights which extend only partially along the base edges of the marker.

What I claim is:

1. A road marker comprising a hollow body member fabricated of a flexible, resilient material, said hollow body member including a base portion and an upper portion, said upper portion being disposed above said base portion and extending upwardly therefrom, and weighting means associated with said base portion and lowering the centre of gravity of said hollow body member, said weighting means comprising a plurality of separate weights spaced apart from and discontinuous with respect to each other, said weights being located at different points around a perimeter of said base portion and thereby being separated from each other by unweighted parts of said base portion.

2. A road marker according to claim 1 wherein said weights are of metal.

3. A road marker according to claim 1 wherein said base portion is provided with a plurality of pockets formed in said material of which said base portion is fabricated, said weights being located in said pockets.

4. A road marker according to claim 1 wherein said base portion has substantially straight base edges meeting at base corners, said weights being located only adjacent said base corners.

5. A road marker according to claim 1 wherein said base portion has substantially straight base edges meeting at base corners, said base portion also being provided with a plurality of pockets formed in said material of which said base portion is fabricated, said pockets being located adjacent said base corners, said weights being located in said pockets.

6. A road marker according to claim 1 wherein said base portion is of polygonal configuration in plan having lateral faces and base edges meeting at base corners, said lateral faces being inclined upwardly from said base edges towards said upper portion and an imaginary apex, and wherein said base portion is provided with a plurality of pockets formed in said material of which said base portion is fabricated, said weights being located in said pockets, said pockets being located adjacent said base corners.

7. A road marker according to claim 1 wherein said base portion is of polygonal configuration in plan having lateral faces and base edges meeting at base corners, said lateral faces being inclined upwardly from said base edges towards said upper portion and an imaginary apex, said weights being mounted in said lateral faces.

8. A road marker according to claim 1 wherein said base portion is of polygonal configuration in plan having lateral faces and base edges meeting at base corners, said lateral faces being inclined upwardly from said base edges towards said upper portion and an imaginary apex, said weights being mounted in said lateral faces adjacent said base corners, a portion of each of said weights being mounted in each of two adjacent ones of said lateral faces, said weights extending uninterruptedly around each of said base corners.

9. A road marker according to claim 1 wherein said base portion is of polygonal configuration in plan having lateral faces and base edges meeting at base corners, said lateral faces being inclined upwardly from said base edges towards said upper portion and an imaginary apex, and wherein pockets are formed in said lateral faces in said material of which said base portions fabricated, said pockets being located adjacent said base corners, said weights being located in said pockets with a portion of each of said weights being mounted in each of two adjacent ones of said lateral faces, said weights extending uninterruptedly around each of said base corners.

10. A road marker according to claim 1 wherein said base portion is of polygonal configuration in plan and has lateral faces inclined upwardly towards said upper portion and defining a first apical angle, said lateral faces meeting at said corners, said upper portion being of polygonal configuration in plan and having at least as many lateral faces as said base portion, said upper portion being formed integral with said base portion, said lateral faces of said upper portion extending upwardly from said lateral faces of said base portion and being inclined to define a smaller apical angle than said apical angle defined by said lateral faces of said base portion, said lateral faces of said upper portion also meeting at side corners, said upper and base portions being so oriented with respect to each other that said side corners of said base portion terminate at points intermediate adjacent side corners of said upper portion.

11. A road marker according to claim 1 wherein said base portion is of polygonal configuration in plan and has lateral faces inclined upwardly towards said upper portion and defining a first apical angle, said lateral faces meeting at side corners, said upper portion also being of polygonal configuration in plan and having twice as many lateral faces as said base portion, said upper portion being formed integral with said base portion, said lateral faces of said upper portion extending upwardly from said lateral faces of said base portion and being inclined to define a smaller apical angle than said apical angle defined by said lateral faces of said base portion, said lateral faces of said upper portion also meeting at side corners, said upper and base portions being so oriented with respect to each other than said side corners of said base portion terminate at points intermediate adjacent side corners of alternate ones of said lateral faces of said upper portion.

12. A road marker according to claim 1 wherein said base portion is of square configuration in plan and has four lateral faces inclined upwardly towards said upper portion and defining a first apical angle, said lateral faces meeting at side corners, said upper portion being of octagonal configuration in plan and having eight lateral faces, said upper portion being formed integral with said base portion, said lateral faces of said upper portion extending upwardly from said lateral faces of said base portion and being inclined to define a smaller apical angle than said apical angle defined by said lateral faces of said base portion, said lateral faces of said upper portion also meeting at side corners, said upper and base portions being so oriented with respect to each other that said side corners of said base portion terminate at points intermediate adjacent side corners of alternate ones of said lateral faces of said upper portion.

13. A road marker according to claim 1 wherein said base portion is of polygonal configuration in plan and has lateral faces inclined upwardly towards said upper portion and defining a first apical angle, said lateral faces meeting at side corners, said upper portion also being of polygonal configuration in plan and having twice as many lateral faces as said base portion, said upper portion being formed integral with said base portion, said lateral faces of said upper portion extending upwardly from said lateral faces of said base portion and being inclined to define a smaller apical angle than said apical angle defined by said lateral faces of said base portion, said lateral faces of said upper portion also meeting at side corners, said upper and base portions being so oriented with respect to each other that said side corners of said base portion terminate at points equidistant from adjacent side corners of alternate ones of said lateral faces of said upper portion.

14. A road marker according to claim 1 wherein said base portion is of polygonal configuration in plan and has lateral faces inclined upwardly toward said upper portion and defining a first apical angle, said lateral faces meeting at side corners, said upper portion being of polygonal configuration in plan and having at least as many lateral faces as said base portion, said upper portion being formed integral with said base portion, said lateral faces of said upper portion extending upwardly from said lateral faces of said base portion and being inclined to define a smaller apical angle than said apical angle defined by said lateral faces of said base portion, said lateral faces of said upper portions also meeting at side corners, said upper and base portions being so oriented with respect to each other that said side corners of said base portion terminate at points intermediate adjacent side corners of said upper portion, and reinforcing struts formed integral with said base and upper portions and extending between at least some of said lateral faces of said base portion and at least some of said lateral faces of said upper portion.

15. A road marker according to claim 1 wherein said base portion is of polygonal configuration in plan and has lateral faces inclined upwardly towards said upper portion and defining a first apical angle, said lateral faces meeting at side corners, said upper portion being of polygonal configuration in plan and having at least as many lateral faces as said base portion, said upper portion being formed integral with said base portion, said lateral faces of said upper portion extending upwardly from said lateral faces of said base portion and being inclined to define a smaller apical angle than said apical angle defined by said lateral faces of said base portion, said lateral faces of said upper portion also meeting at side corners, said upper and base portions being so oriented with respect to each other that said side corners of said base portion terminate at points intermediate adjacent side corners of said upper portion, said base portion having substantially straight base edges meeting at base corners, said base portion also being provided with a plurality of pockets formed in said material of which said base portion is fabricated, said pockets being located adjacent said base corners, said weights being located in said pockets but only adjacent said base corners.

16. A road marker comprising: a hollow body member fabricated of a flexible, resilient material, said hollow body member including a base portion and an upper portion, said upper portion being disposed above said base portion and extending upwardly therefrom, said base portion being of polygonal configuration in plan and having lateral faces inclined upwardly towards said upper portion and defining a first apical angle, said lateral faces meeting at side corners, said upper portion being of polygonal configuration in plan and having at least as many lateral faces as said base portion, said upper portion being formed integral with said base portion, said lateral faces of said upper portion extending upwardly from said lateral faces of said base portion and being inclined to define a smaller apical angle than said apical angle defined by said lateral faces of said base portion, said lateral faces of said upper portion also meeting at side corners, said upper and base portions being so oriented with respect to each other that said side corners of said base portion terminate at points intermediate adjacent side corners of said upper portion.

17. A road marker according to claim 16 wherein said upper portion has twice as many lateral faces as said base portion and wherein said side corners of said base portion terminate at points intermediate adjacent side corners of alternate ones of said lateral faces of said upper portion.

18. A road marker according to claim 17 wherein said base portion is of square configuration in plan and has four lateral faces and said upper portion is of octagonal configuration in plan and has eight lateral faces.

19. A road marker according to claim 16 wherein said side corners of said base portion terminate at points equidistant from adjacent side corners of said upper portion.

20. A road marker according to claim 18 wherein said side corners of said base portion terminate at points equidistant from adjacent side corners of said upper portion.

21. A road marker according to claim 16 including reinforcing struts formed integral with said base and upper portions and extending between at least some of said lateral faces of said base portion and at least some of said lateral faces of said upper portion.

22. A road marker according to claim 20 including reinforcing struts formed integral with said base and upper portions and extending between said lateral faces of said base portion and those ones of said lateral faces of said upper portion other than the ones at which said side corners of said base portion terminate.

23. A road marker comprising a hollow body member fabricated of a flexible, resilient material, said hollow body member including a base portion and an upper portion, said upper portion being disposed above said base portion and extending upwardly therefrom, said base portion being of polygonal configuration in plan having lateral faces and base edges meeting at base corners, said lateral faces being inclined upwardly from said base edges towards said upper portion and an imaginary apex and a plurality of reinforcing means reinforcing said lateral faces and disposed adjacent said base edges, said reinforcing means being spaced apart from and discontinuous with respect to each other and located at different points around a perimeter of said base portion.

24. A road marker according to claim 23 wherein said reinforcing means are disposed adjacent said base corners.

25. A road marker according to claim 24 wherein said reinforcing means are ribs formed in said lateral faces and extending parallel to adjacent ones of said base edges.

26. A road marker according to claim 23 wherein said reinforcing means are ribs formed in said lateral faces and provided only adjacent said corners.

27. A road marker according to claim 23 wherein said reinforcing means are ribs formed in said lateral faces and extending uninterruptedly about each of said base corners but only part way along each of said lateral faces 28. A road marker according to claim 16 including a plurality of reinforcing means reinforcing said lateral faces of said base portion, said reinforcing means being spaced apart from and discontinuous with respect to each other and located at different points around a perimeter of said base portion.

29. A road marker according to claim 28, wherein said reinforcing means are ribs formed in said lateral faces and extending uninterruptedly about each of said base corners but only part way along each of said lateral faces.

References Cited

UNITED STATES PATENTS

| | | | |
|---|---|---|---|
| 1,401,144 | 12/1921 | Dicks | 248—44 |
| 2,483,734 | 10/1949 | Heal | 116—63 |
| 2,762,328 | 9/1956 | Weig | 116—63 |
| 2,771,260 | 11/1956 | Thom | 248—44 |
| 3,147,734 | 9/1964 | Knapp | 116—63 |
| 3,247,823 | 4/1966 | Buck et al. | 116—63 |
| 3,202,909 | 2/1967 | Glassman | 248—44 |
| 2,957,444 | 10/1960 | Boettler | 116—63 |
| 3,132,624 | 5/1964 | Shoemaker | 116—63 |

FOREIGN PATENTS

| | | |
|---|---|---|
| 216,329 | 12/1956 | Australia. |
| 1,498,633 | 9/1967 | France. |

LOUIS J. CAPOZI, Primary Examiner.

U.S. Cl. X.R.

94—1.5